United States Patent Office 2,828,468
Patented Mar. 25, 1958

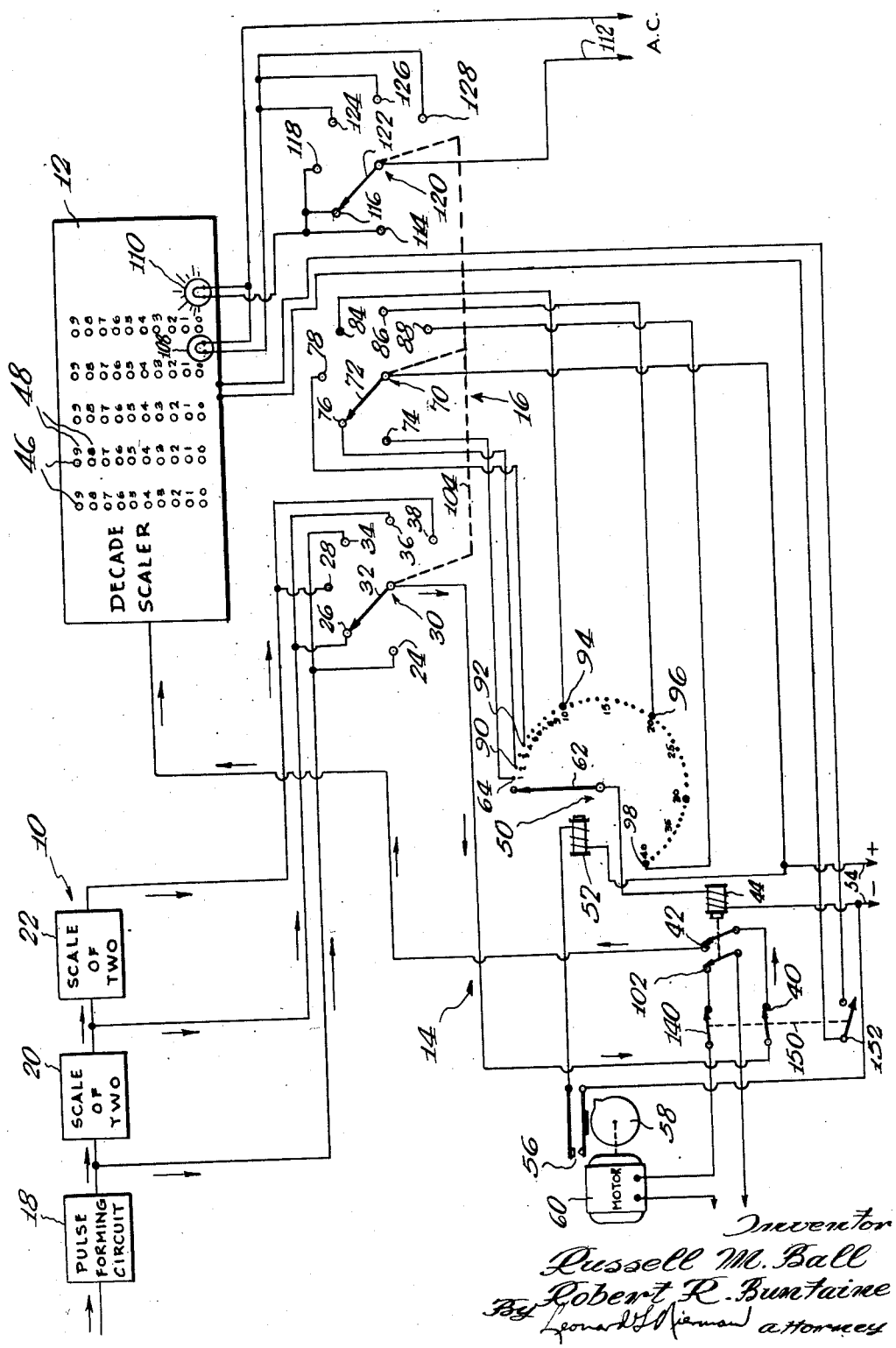

2,828,468

APPARATUS FOR MEASURING THE RATE OF OCCURRENCE OF ELECTRICAL PULSES

Russell M. Ball, Chicago, and Robert R. Buntaine, Elmhurst, Ill., assignors to Nuclear-Chicago Corporation, Chicago, Ill., a corporation of Illinois Application March 4, 1953, Serial No. 340,356

16 Claims. (Cl. 324—78)

This invention relates to apparatus for the counting of electrical pulses, and more specifically to apparatus for the measurement of the average rate of occurrence of randomly occurring electrical pulses.

In a number of circumstances, notably in the measurement of radioactivity, it is required that the rate of occurrence of randomly occurring electrical pulses be measured in terms of the rate of occurrence per unit time. In the field of radioactivity, the electrical pulses, generated by a suitable detector such as a GM tube, scintillation counter, etc., are referred to as "counts" and it is commonly desired to measure the radioactivity of a sample in terms of "counts per minute" or, more rarely, "counts per second." This measurement has been performed in various ways in the past. One way of performing this measurement is to simply record the number of pulses on a suitable register, such as a binary or decade scaling system, and thereafter to divide the number of counts registered by the time interval during which the measurement was made, such time interval being selected to give the desired accuracy in the particular range of counting rates encountered. In another type of system, there is employed the type of device commonly known as a counting-rate meter, in which there is produced an integrated or averaged meter deflection, the magnitude of which is a direct indication of the counting rate. Such a type of device is not in general useable for accurate measurements at low counting rates, because the statistical variations which occur in the rate of occurrence of randomly occurring pulses produce substantial variations in meter readings unless excessively long time constants are employed in the integrating circuit of the device. Another type of device which has been developed in order to avoid the mathematical operation of dividing the number of pulses recorded by the elapsed time interval is the "predetermined count" system, in which a fixed number of counts is recorded, and the elapsed time is a measurement of the counting rate.

The present system is a novel type of device for the above purposes. In the present system, the pulses under measurement are scaled or divided prior to being recorded on the register, and the system is so arranged that the scaling factor is equal to the number of units of time (minutes or seconds) during which the counting operation takes place, as governed by the setting of the timing switch. Thus, since the pulses being counted are divided by a factor equal to the number of units of time employed in the counting operation, the reading of the register upon which the pulses are recorded constitutes a direct reading of the number of input pulses which occur per time unit. The provision of a counting system having a scaling circuit with a plurality of selectable scaling factors, timing means to activate the counting system for any preset one of a plurality of numbers of time units equal to respective scaling factors of the scaling circuit, and means operable to set the scaling factor equal to any number of time units for which the timing means is set, produces a device wherein the number of pulses registered on a register to which this combination is coupled is equal to the average rate of occurrence of input pulses per unit time.

Additionally, it may be seen that the register reading may easily be corrected by the user as regards variations in time interval which are decimal in character without the necessity of making any calculation. Thus the present system also provides for timing intervals which are decimal multiples of the respective scaling factors of the scaling circuit through which the pulses are fed before recording on the register. Thus, the user may directly read the desired data from the register over an extremely large range of values, without the necessity of making any correction other than the moving of a decimal point. In the embodiment of the invention later to be described herein, the register, upon which the pulses are counted after such scaling, is provided with suitable indicators between its digital indicia, so that the decimal point location is automatically indicated on the face of the register.

The above general description of the purposes of the invention and the manner in which these purposes are accomplished will enable persons skilled in the art to design a large variety of specific devices in which the general features of the invention are utilized. However, both because of the requirements of the patent laws for illustration and description of a specific embodiment of the invention, and because the embodiment hereinafter described contains other novel features and advantages than those described above, there is hereto appended a drawing of a particular embodiment of the invention, the description of which embodiment is presented below with reference to the drawing.

The single figure of the drawing is a schematic electrical diagram of an apparatus made in accordance with the invention, employing block designations for some of the component parts of the system whose constructions are well known in the art.

As shown in the drawing, the system consists generally of a scaling circuit generally designated by the numeral 10 having a plurality of selectable scaling factors, a registering means constituting a decade scaler 12, coupled to the output of the scaling circuit 10 to register the pulses emitted thereby, timing means, generally designated by the numeral 14, to activate the above counting system for any preset one of a plurality of numbers of time units equal to respective scaling factors of the scaling circuit 10, and means generally indicated by the numeral 16 coupled to the scaling circuit 10 and operable to set the scaling factor thereof equal to any number of time units for which the timing means 14 is preset.

Describing the device shown in the drawing more specifically the scaling circuit 10 comprises an input circuit 18, coupled to a scale-of-two 20, which is in turn coupled to a second scale-of-two 22. In the embodiment illustrated, the input circuit 18 comprises a pulse-forming circuit of any well known type which is employed to equalize the pulses fed to the system in order to optimize the performance of the subsequent scaling stages. It will of course be understood that the input circuit 18 may not require the incorporation of a pulse-forming circuit where the input pulses are identical in their characteristics. The outputs of the input circuit 18 and the scales-of-two 20 and 22, which may be of any conventional construction, are connected to stationary contacts 24, 26 and 28 of a switch 30, having a movable contact 32, and also, in parallel with respective contacts 24, 26 and 28, to additional stationary contacts 34, 36 and 38. The movable contact 32 is connected through a switch 40 and normally closed relay contacts 42 of a relay 44 to the input of the decade scaler 12 which serves as the register from which the counting rate is read. The scaling circuit comprising the input circuit 18 and the scales-of-two 20 and 22 and the switch 30 thus constitute a scaling circuit with a plurality of selectable scaling factors. When the movable switch contact 32 is positioned to contact the contact 24 or 34, the scaling factor is one (the scaling factor of the input circuit). When the stationary contact 26 or 36 is contacted, the scaling factor is two, and when the stationary contact 28 or 38 is contacted, the scaling factor is four. Obviously, although the simplicity of such a construction for obtaining a variable scaling factor renders it highly desirable for purposes of the present system, any other device for producing a variable scaling factor, such as the biasing of binary stages to "one-shot" operation, the insertion and removal of pulse feedback loops, change in the size of a ring, etc., many of which are well known, may also be used. However, in addition to the matter of simplicity, the use of the factors 1, 2 and 4, when combined with the decimal multiplying arrangement hereinafter to be described, enables simple selection of time intervals over a very wide range, in multiplication steps not exceeding two and one-half.

As schematically illustrated, the scaler 12 is of the common decade type in which there are provided columns of indicator bulbs 46, provided with suitable numerical indicia 48, so that the total number of pulses registered is easily read from the face of the scaler. The utilization of other types of registers, such as binary system scalers or, for low counting rates, mechanical registers, will be obvious, although the employment of a register giving a direct numerical indication in the decimal, as opposed to the binary, system is desirable where time intervals which are decimal multiples are to be employed. However, it is within the scope of the invention to employ a binary system throughout.

The timing means 14 consists basically of a stepping switch 50, which is driven by pulses occurring at fixed time intervals (each interval being one minute in the embodiment of the invention herein being described). The stepping switch 50 is of the multi-level type generally available from manufacturers of relays, for example those manufactured by C. P. Clare & Co., known as "Springdriven Stepping Switches." As is well known, such switches are driven by the application of pulses to a coil (indicated in the drawing at 52), and may be obtained with extremely large numbers of contacts. For purposes of simplicity of illustration, the switch 50 has been illustrated as having forty contacts, although switches with much higher numbers of contacts may be employed to extend the number of decades of time intervals for which the device may be employed, as hereinafter to be mentioned. The winding 52 of the switch 50 is connected to a source 54 of direct voltage through a pair of contact points 56, which are driven by a cam 58, which is rotated by a motor 60. The motor 60 is a 1 R. P. M. synchronous motor, so that the movable contact 62 of the stepping switch 50 is advanced one position each minute.

The movable contact 62 is connected to one side of the direct voltage source 54 through the winding of the relay 44. The first fixed contact 64 of the stepping switch is connected to a fixed contact 74 of a switch 70 having a movable contact 72 adapted to contact fixed contacts 74, 76, 78, 84, 86, and 88. The second fixed contact 90 is connected to the fixed contact 76, the fourth 92 to the contact 78, the tenth 94 to the contact 84, the twentieth 96 to the contact 86 and the fortieth 98 to the contact 88. The movable contact 72 of the switch 70 is connected to the side of the voltage source 54 opposite the connection of the movable contact of the switch 50 through the relay 44. When the movable contact 72 of the switch 70 is positioned to contact one of the fixed contacts above mentioned, the movable contact 62 of the stepping switch 50 moves one step each minute until it reaches the fixed contact which is connected to the fixed contact of the switch 70 upon which the movable contact 72 is positioned. At this point current flows from the voltage source 54 through the relay 44 and opens the contacts 42, which disconnects the scaling circuit 10 from the decade scaler or register 12. At the same time, a second set of contacts 102 associated with the relay 44, which are in series with the motor 60, opens and thus shuts off the motor to stop further progression of the stepping switch. It will be seen that the switch 70 comprises a manually operable presetting means having a discrete and separate position for each timing interval, each setting of the timing device being a decimal multiple (the multipliers being 1 and 10) of one of the scaling factors of the input and scaling circuits. The timer switch and drive system, schematically indicated, although desirable in simplicity, are of course merely exemplary of a large number which may be employed. The obtaining of suitable time intervals by many other mechanical and electrical timers and timer switches is obviously simple.

The switch 30 is ganged with the switch 70 as indicated in the drawing by the dotted line 104. By means of this ganging the setting of the switch 30 so that the movable contact 32 engages the fixed contact 24, 26, 28, 34, 36 or 38 at the same time engages the movable contact 72 with the fixed contact 74, 76, 78, 84, 86 or 88 respectively. It will thus be seen that the system is so arranged that the scaling factor of the scaling circuit 10 is one when the timing interval is one minute or ten minutes, is two when the timing interval is two minutes or twenty minutes, and is four when the timing interval is four minutes or forty minutes. Many structures other than that illustrated can of course be used to produce this relation.

When the timing interval is set at one, two or four minutes (the integer times the zero power of ten), the reading of the register 12 which is obtained at the conclusion of the timing interval is a direct indication of the average rate of occurrence of input pulses during the timing interval. When the timing interval is ten, twenty or forty minutes (the integer times the first power of ten), it is necessary merely that the operator read the indication of the register by inserting a decimal point between the last two digits of the reading in order to obtain an accurate numerical value of the counting rate. In order to further simplify use of the instrument, there are added to the system indicator light bulbs 108 and 110, the former being between the units and tens columns of the register indicia, and the latter being at the right of all of the register indicia (and thus being a mere optional convenience). The indicator light 110 is connected to a power source 112 through three fixed contacts 114, 116 and 118 of a switch 120 having a movable contact 122, and the indicator light 108 is connected to the three remaining fixed contacts 124, 126 and 128 of the switch 120. The switch 120 is ganged with the switches 30 and 70, and the bulb 110 is lighted when the ganged switch is in a position where the multiplier of the integral values 1, 2 and 4 is one, the bulb 108 being lighted when the gang switch is in a position where the multiplier of the integral values 1, 2 and 4 is ten. Adaptation of the system to requirements of employing other powers of ten as multipliers (as in counting for decimal portions of a minute, or hundreds of seconds, for example) are obvious, as are systems wherein the time unit multiplying factor is other than decimal, as in a unit capable of reading directly in both counts per minute and counts per second.

After the taking of a reading, and in order to restore the apparatus to condition for a new measurement, manually operable switches 40 and 140, in series with respective relay contacts 42 and 102, are opened, thus permitting resetting of the stepping switch 50 and, if necessary, the cam 58 (by conventional means not shown) to the zero position without starting the motor 60 or feeding pulses through from the scaling circuit 10 to the register 12. In this same operation, by ganging indicated at 150, a reset switch 152, commonly provided for resetting to zero of a decade scaler or similar register, is actuated to reset the register to zero. Thereafter, the gang switches 30, 70 and 120 are set to the desired position for a new measurement operation, and the equipment is reactivated by reversal of the position of the switches 140, 40 and 152, the two former being again closed and the latter opened.

Needless to state, persons skilled in the art will readily devise or find large numbers of equivalent components for use in the combination of the invention, both as generally described above and as specifically set forth in connection with the illustrated embodiment. Accordingly, the invention should not be deemed to be limited in any respect by the specific embodiment illustrated, but shall be limited only by the definition thereof in the appended claims.

What is claimed is:

1. Apparatus for measuring the rate of occurrence of electrical pulses comprising accounting system having a scaling circuit with a plurality of selectable scaling factors and registering means coupled to the output of the scaling circuit to register the pulses emitted thereby, timing means to activate the counting system for any preset one of a plurality of numbers of time units equal to respective scaling factors of the scaling circuit and including manually operable presetting means having discrete and separate positions for each of said numbers of time units, and means coupling the scaling circuit to the timing means to set said scaling factor equal to the number of time units for which the timing means is so preset, whereby the number of pulses registered on the registering means during any preselected number of time units is equal to the average rate of occurrence of input pulses per time unit.

2. Apparatus for measuring the rate of occurrence of electrical pulses comprising a counting system having a scaling circuit with a plurality of selectable scaling factors and registering means coupled to the output of the scaling circuit to register the pulses emitted thereby, timing means to activate the counting system for any preset one of a plurality of numbers of time units constituting constant multiples of respective scaling factors of the scaling circuit and including manually operable presetting means having discrete and separate positions for each of said numbers of time units, and means coupling the scaling circuit to the timing means to set said scaling factor to thus correspond to the number of time units for which the timing means is so preset, whereby the number of pulses registered on the registering means during any preselected number of time units is constantly proportional to the average rate of occurrence of input pulses per time unit.

3. The apparatus of claim 2 wherein the multiplying constant is an integral power of 10, whereby the number of pulses registered is a decimal multiple of the average rate of occurrence.

4. Apparatus for measuring the rate of occurrence of electrical pulses comprising a counting system having a scaling circuit with a plurality of selectable scaling factors and registering means coupled to the output of the scaling circuit to register the pulses emitted thereby, timing means to activate the counting system for any preset one of a plurality of numbers of time units equal to respective scaling factors of the scaling circuit and decimal multiples thereof and including manually operable presetting means having discrete and separate positions for each of said numbers of time units, and means coupling the scaling circuit to the timing means to set said scaling factor to thus correspond to the number of time units for which the timing means is so preset, whereby the number of pulses registered on the registering means during any preselected number of time units is a direct indication of the average rate of occurrence of input pulses per time unit.

5. The apparatus of claim 4 wherein there is provided at least one indicator on the registering means responsive to setting of the timing means to indicate the corresponding location of the decimal point thereon.

6. Apparatus for measuring the rate of occurrence of electrical pulses comprising a counting system having a scaling circuit with a plurality of selectable scaling factors and registering means coupled to the output of the scaling circuit to register the pulses emitted thereby, timing means to activate the counting system for any preset one of a plurality of numbers of time units equal to respective scaling factors of the scaling circuit and including manually operable presetting means having discrete and separate positions for each of said numbers of time units, and means coupled to the scaling circuit and to the timing means and operable to vary simultaneously and correspondingly the timing interval of the timing means and the scaling factor of the scaling circuit.

7. Apparatus for use in a counting system comprising a scaling circuit with a plurality of selectable scaling factors and having an output circuit adapted to be connected to a register, timing means adapted to activate a counting system for any preset one of a plurality of numbers of time units equal to respective scaling factors and including manually operable presetting means having discrete and separate positions for each of said numbers of time units, and means coupling the scaling circuit to the timing means to set the scaling factor equal to the number of timing units for which the timing means is so preset, whereby the number of pulses registered on a register to which the output circuit is connected is equal to the average rate of occurrence of input pulses per time unit.

8. Apparatus for use in a counting system comprising a scaling circuit with a plurality of selectable scaling factors and having an output circuit adapted to be connected to a register, timing means adapted to activate a counting system for any preset one of a plurality of numbers of time units constituting constant multiples of respective scaling factors and including manually operable presetting means having discrete and separate positions for each of said numbers of time units, and means coupling the scaling circuit to the timing means to set the scaling factor to correspond to the number of timing units for which the timing means is so preset, whereby the number of pulses registered on a register to which the output circuit is connected during any preset number of time units is constantly proportional to the average rate of occurrence of input pulses per time unit.

9. The apparatus of claim 8 wherein the multiplying constant is an integral power of ten, whereby the number of pulses registered is a decimal multiple of the average rate of occurrence.

10. Apparatus for use in a counting system comprising a scaling circuit with a plurality of selectable scaling factors and having an output circuit adapted to be connected to a register, timing means adapted to activate a counting system for any preset one of a plurality of numbers of time units equal to a plurality of decimal multiples of respective scaling factors and including manually operable presetting means having discrete and separate positions for each of said numbers of time units, and means coupling the scaling circuit to the timing means to set the scaling factor to thus correspond to the number of timing units for which the timing means is so preset, whereby the number of pulses registered on a register to which the output circuit is connected during any preselected number of time units is a direct indication of the average rate of occurrence of input pulses per time unit.

11. In combination with the apparatus of claim 10, at least one indicator responsive to the setting of said timing means to indicate the location of the decimal point corresponding to the preset time interval on the register.

12. Apparatus for use in a counting system comprising a scaling circuit with a plurality of selectable scaling factors and having an output circuit adapted to be connected to a register, timing means adapted to activate a counting system for any preset one of a plurality of numbers of time units equal to respective scaling factors, and including manually operable presetting means having discrete and separate positions for each of said numbers of time units, and means coupled to both the timing means and the scaling circuit to vary simultaneously and correspondingly the timing interval of the timing means and the scaling factor of the scaling circuit.

13. Apparatus for measuring the rate of occurrence of electrical pulses comprising an input circuit, a first binary scaling stage coupled to the input circuit, a second binary scaling stage coupled to the first binary stage, a register having a plurality of digital indicators adapted to register the number of pulses impressed thereon in the decimal system of numbers, a variable interval timing switch, a selector switch, means responsive to operation of the selector switch to set the timing interval of the timing switch at one of the group consisting of at least two decimal multiples of 1, 2 and 4 units of time and simultaneously to couple the output of the one of said input and scaling stages having a scaling factor equal to the multiplicand of the time unit so set to the input of the register, and means responsive to the timer switch to terminate the registering of pulses on the decade scaler indicators upon termination of the timing interval.

14. Apparatus for measuring the rate of occurrence of electrical pulses comprising a pulse register having a plurality of digital indicators adapted to register the number of pulses impressed thereon in the decimal system of numbers, a variable interval timing switch, means to set the timing interval of the timing switch at decimally related numbers of units of time, at least one indicator member between digital indicators of the register, means responsive to setting of the timing switch to actuate the one of said indicator members corresponding to the inverse of the decimal value of the timing interval so set, and means responsive to the timer switch to terminate the registering of pulses on the register upon termination of the timing interval.

15. Apparatus for measuring the rate of occurrence of electrical pulses comprising an input circuit, a scaling stage coupled to the input circuit, an output circuit adapted to be connected to a register, a variable interval timing switch, means to set the timing interval of the timing switch at one of the group consisting of one unit of time and a number of units of time equal to the scaling factor of the scaling stage and including manually operable presetting means having discrete and separate positions for each of said numbers of time units, means responsive to operation of said setting means to couple the output of the one of said input and scaling stages having a scaling factor equal to the number of time units so set to the output circuit, and means responsive to the timer switch to terminate the registering of pulses on a register to which the apparatus may be so connected upon termination of the timing interval.

16. Apparatus for measuring the rate of occurrence of electrical pulses comprising an input circuit, a scaling stage coupled to the input circuit, an output circuit, a variable interval timing switch, means to set the timing interval of the timing switch at a number of units of time of the group consisting of at least two decimal multiples of unity and of the scaling factor of the scaling stage, means responsive to operation of said setting means to couple the output of the one of said input circuit and scaling stages having a scaling factor equal to the multiplicand of the time unit so set to the output circuit, at least one indicator member, means responsive to operation of said setting means to actuate the indicator member corresponding to the inverse of the decimal multiplier of the timing interval so set, and means responsive to the timer switch to terminate the counting of pulses upon termination of the timing interval.

References Cited in the file of this patent

UNITED STATES PATENTS

| 2,567,133 | Studley | Sept. 4, 1951 |
| 2,609,144 | Hamacher | Sept. 2, 1952 |
| 2,619,601 | Zollers | Nov. 25, 1952 |
| 2,629,824 | MacKay et al. | Feb. 24, 1953 |
| 2,676,756 | Gulley | Apr. 27, 1954 |
| 2,735,066 | Corl et al. | Feb. 15, 1956 |

FOREIGN PATENTS

| 646,244 | Great Britain | Nov. 15, 1950 |

OTHER REFERENCES

"Electrical Impulse Counter," Garner and Oakley; Notes from the Biochemical Research Foundation, February 1949; pp. 183–189. Journal of Franklin Institute.

"A Comprehensive Counting System for Nuclear Physics Research"; Moody, Howell, Battell and Toplin, The Review of Scientific Instruments, July 1951; pp. 455–461.